US012778178B2

(12) United States Patent
Danos et al.

(10) Patent No.: US 12,778,178 B2
(45) Date of Patent: Nov. 3, 2026

(54) SYSTEM FOR THE CONTINUOUS PREPARATION OF A FOOD PRODUCT EXTRUDED FROM A PROTEIN-RICH AND WATER-RICH MATERIAL

(71) Applicant: CLEXTRAL, Firminy (FR)

(72) Inventors: Lionel Danos, St Paul en Jarez (FR); Luis Asensio, Savigneux (FR); Jérôme Mottaz, Saint-Maurice de Lignon (FR)

(73) Assignee: CLEXTRAL, Firminy (FR)

(*) Notice: Subject to any disclaimer, the term of this patent is extended or adjusted under 35 U.S.C. 154(b) by 331 days.

(21) Appl. No.: 18/292,657

(22) PCT Filed: Jul. 26, 2022

(86) PCT No.: PCT/EP2022/070887
§ 371 (c)(1),
(2) Date: Jan. 26, 2024

(87) PCT Pub. No.: WO2023/006713
PCT Pub. Date: Feb. 2, 2023

(65) Prior Publication Data

US 2024/0341343 A1 Oct. 17, 2024

(30) Foreign Application Priority Data

Jul. 27, 2021 (FR) ...................................... 2108134

(51) Int. Cl.
*A23P 30/20* (2016.01)
*A23J 3/26* (2006.01)

(52) U.S. Cl.
CPC ................. *A23P 30/20* (2016.08); *A23J 3/26* (2013.01)

(58) Field of Classification Search
CPC .......... A23P 30/20; A23P 30/25; B29C 48/33; B29C 48/873; B29C 48/40
See application file for complete search history.

(56) References Cited

U.S. PATENT DOCUMENTS

2003/0091710 A1 5/2003 Bajema
2005/0017412 A1* 1/2005 Maier .................... B29C 48/40 425/207

(Continued)

FOREIGN PATENT DOCUMENTS

CH 353526 A 4/1961
WO 03007729 A1 1/2003

(Continued)

OTHER PUBLICATIONS

Search Report for French Application No. 2108134 dated Mar. 31, 2022.

(Continued)

*Primary Examiner* — Emmanuel S Luk
*Assistant Examiner* — Nicholas J Chidiac
(74) *Attorney, Agent, or Firm* — McDonald Hopkins LLC

(57) ABSTRACT

A system comprises a protein-rich and water-rich raw material, a sleeve within which at least one screw is driven so as to subject the raw material to a thermomechanical treatment, and a die. The die comprises a tubular outer casing having a frusto-conical lower face which diverges downstream, this outer casing being fixedly connected to the sleeve such that the material exiting the sleeve is pushed through the die by the screw or screws. The die also comprises an internal member mounted so as to rotate coaxially relative to the casing and including both an upstream part which extends at least partially inside the casing and has a frusto-conical outer face that diverges downstream and a downstream part which extends outside the casing and is coupled to a drive for rotating the member. The casing and/or the upstream part of the member are thermally regulated.

13 Claims, 6 Drawing Sheets

(56) References Cited

U.S. PATENT DOCUMENTS

| | | | | |
|---|---|---|---|---|
| 2023/0043707 A1* | 2/2023 | Breton | .................... | A23J 3/26 |
| 2024/0188587 A1* | 6/2024 | Pibarot | .................... | A23J 3/18 |
| 2024/0298670 A1* | 9/2024 | Breton | .................... | A23J 3/14 |
| 2024/0324625 A1* | 10/2024 | Harshe | .................... | A23J 3/14 |
| 2024/0349753 A1* | 10/2024 | Breton | .................... | A23J 3/26 |
| 2025/0000104 A1* | 1/2025 | Shpaisman | ............ | A23J 3/227 |

FOREIGN PATENT DOCUMENTS

| | | |
|---|---|---|
| WO | 2010117380 A1 | 10/2010 |
| WO | 2021136816 A1 | 7/2021 |

OTHER PUBLICATIONS

Search Report for International Application No. PCT/EP2022/070887 dated Nov. 11, 2022.

* cited by examiner

SYSTEM FOR THE CONTINUOUS PREPARATION OF A FOOD PRODUCT EXTRUDED FROM A PROTEIN-RICH AND WATER-RICH MATERIAL

This is a National Stage application of PCT international application PCT/EP2022/070887, filed on Jul. 26, 2022, which claims priority from French Patent Application No. 21 08134, filed on Jul. 27, 2021, both which are incorporated herein by reference in their entirety.

The present invention relates to a system of continuous preparation of an extruded food product, comprising a die for extrusion of a protein and water-rich material.

The invention addresses extrusion machines which include a sleeve inside which, one or a plurality of screws, in particular two screws, are rotated on themselves so that the screws pull along a material to be extruded from an upstream part of the sleeve to the downstream end of the sleeve where the material is then forced to flow through an extrusion die, provided for shaping, texturing and/or fibrating the extruded material. Such an extrusion machine applies a thermo-mechanical treatment to the material, in the sense that the material undergoes both an essentially mechanical transformation, through pressurization and through shearing by the screws, and an essentially heat transformation, through temperature regulation along the sleeve.

More specifically, the invention relates to the extrusion of water-rich high-protein materials, and the associated food-processing extrusion machines for continuously preparing a textured food product from a water-rich high-protein raw material. The proteins of the raw material can be of animal and/or of plant origin and/or of any other origin. In all cases, the proteins are mixed with a large proportion of water, as well as, if appropriate, fats and additives, and the corresponding mixture is subject to the thermo-mechanical treatment applied by the extrusion machine in order to be heated and gelled before being shaped in the die. The texturization, otherwise known as fibration, of a food product essentially takes place in the die of the extrusion machine, through which the material emerging from the sleeve of the machine is pushed by the screws of the machine. The method for preparing food products based on fiberized proteins is known under the name "CEMH" which is the acronym of the French expression "Cuisson-Extrusion en Milieu Humide" [Extrusion-cooking in a damp medium], as well as under the name "HME" which is the acronym of the English expression "High Moisture Extrusion".

WO 03/007729 discloses a CEMH method and an associated extrusion machine, wherein the die is designed for cooling in a controlled manner the material flowing through, by making the material flow through a channel which has both a great length, typically of several meters, and a rectangular cross-section, a temperature profile being applied along the channel so as to gradually decrease the temperature of the material between the inlet and the outlet of the channel. The material in contact with the cooled wall of the channel tends to adhere to said wall, thereby shearing the laminar flow of material in the channel. The shearing contributes to the development of current lines within the material paste and tends to align denatured macromolecules along the direction of flow. In practice, the shear rate and the flow regime result from the fixed geometry of the channel, so that the control of the fibration requires that the channel and, thereby, the processing time in the die, are long.

US 2003/091710 discloses a die for the extrusion of a starch material. Such die includes a tubular outer casing, a downstream part of which delimits a frusto-conical inner face and a cylindrical upstream part of which is directly rigidly attached coaxially to the outlet of the sleeve of an extruder. The die further includes an internal member arranged coaxially inside the downstream part of the outer casing. On the downstream side thereof, the internal member is coupled to a motor in order to rotate the internal member about a central axis of the die. In addition, the internal member defines a conical outer face so as to form, between the latter and the frusto-conical inner face of the outer casing, a channel through which the starch material moves towards a downstream end where the material exits the outer casing.

The goal of the present invention is to propose a system of continuous preparation of a food product extruded from a water-rich high-protein material, which would be less bulky, and more efficient and adaptable with respect to the fibration of the product coming out of the die.

For this purpose, the subject matter of the invention is a system for continuous preparation of an extruded food product, comprising:

- a raw material that is rich in protein and water,
- a sleeve inside which at least one screw is driven so as to apply a thermomechanical treatment to the raw material, and
- a die for extrusion of a protein and water-rich material, the die comprising:
- an outer casing, which is tubular, being centered on an axis, and which has a frusto-conical inner face, centered on the axis and divergent downstream, the outer casing being fixedly connected to the sleeve so that the material emerging from the sleeve is pushed by the at least one screw through the die, and
- an internal member, which is arranged coaxially inside the outer casing and mounted so as to rotate about the axis with respect to the outer casing, and which includes both:
- an upstream part, extending at least partially inside the outer casing and having a frusto-conical outer face, centered on the axis and diverging towards the downstream, and
- a downstream part, extending outside the outer casing and coupled to a motorization suitable for rotating the internal member about the axis,
- wherein the outer casing and/or the upstream part of the internal member are thermally regulated,
- wherein the frusto-conical inner face of the outer casing and the frusto-conical outer face of the internal member delimit therebetween a channel having an upstream end and a downstream end, which are opposite each other along the axis and between which the material flows in the channel, so that when the material is pushed through the die, the material advances through the channel from the upstream end to the downstream end through which the material exits outside of the outer casing,
- wherein the sleeve includes, at the downstream end thereof, an end plate which internally delimits a through bore, centered on the axis and channeling the material pushed by the at least one screw out of the sleeve,
- and wherein the system further includes a diffuser, which fixedly connects the end plate and the outer casing and which delimits a distribution chamber connecting the bore of the end plate and the upstream end of the channel, the distribution chamber being shaped so as to distribute the material emerging from the sleeve around the axis into the upstream end of the channel.

One of the ideas underlying the invention is to design an extrusion die which, while providing good heat exchange with the material flowing through, can be used for adjusting the shear rate applied to the flow of the material in the die, by making it possible to use the adjustable shear rate as a control parameter of the die. To this end, the die defines a channel wherein the material passing through the die flows, the channel being delimited by the coaxial arrangement of a frusto-conical outer surface of an internal member of the die in a frusto-conical inner surface of an outer casing of the die, the two frusto-conical surfaces being divergent towards the downstream. The distance separating the two aforementioned frusto-conical faces defines the thickness of the channel and can be modified by acting on the relative axial positioning of the internal member and the outer casing, where appropriate by means of an ad hoc adjustment device. In practice, the invention covers multiple possibilities with regard to the respective angulations of the frusto-conical outer face of the internal member and of the frusto-conical inner face of the outer casing: more particularly, it can be provided for that (i) the respective angulations are equal to or different from each other along the channel and/or (ii) one and/or the other of the angulations are/is constant along the channel or vary along the channel, which, in the latter case, is equivalent to saying that the or each frusto-conical face concerned does not consist of a single truncated cone but of an axial juxtaposition of at least two coaxial truncated cones, the vertex angles of which are different from each other. Moreover, the outer casing and/or the internal member are thermally regulated so that the frusto-conical inner face of the outer casing and/or the frusto-conical outer face of the internal member, against which the material flows in the channel, can have a different temperature, e.g. lower, compared to the temperature of the material, which causes the material to adhere, at a variable extent, to the frusto-conical inner face of the outer casing and/or to the frusto-conical outer face of the internal member. The heat transfer between, on the one hand, the outer casing and/or the internal member and, on the other hand, the material flowing in the channel is substantial, because of the extended frusto-conical contact interfaces. At the same time, the internal member is rotatably mounted about the central axis of the die so that, by rotating the internal member with respect to the outer casing, the material flowing through the channel tends to wrap around the frusto-conical outer face of the internal member. The material flowing through the channel is thereby strongly sheared between the frusto-conical inner face of the outer casing and the frusto-conical outer face of the internal member, with a shear rate which is adjustable by changing the speed and/or direction of rotation of the internal member and/or by adjusting the thermal regulation of the outer casing and/or by modifying the axial position of the internal member with respect to the outer casing. The die can thereby be used for obtaining and finely controlling the fibration of the material flowing in the channel and hence the fibration of the extruded food product which is continuously prepared by the system according to the invention, while noting that the die is compact, i.e. taking little space along the direction of the central axis thereof.

According to advantageous additional features of the system according to the invention:

- the die includes an adjustment device suitable for adjustably modifying a position of the internal member with respect to the outer casing along the axis.
- the outer casing is provided with thermoregulation means suitable for acting on the temperature of the material flowing in the channel by heat exchange with the frusto-conical inner face and for applying a temperature profile along the channel between the upstream and downstream ends of the channel.
- the upstream part of the internal member is provided with thermoregulation means suitable for acting on the temperature of the material flowing in the channel by heat exchange with the frusto-conical outer face and for applying a temperature profile along the channel between the upstream and downstream ends of the channel.
- the outer casing comprises at least two separate modules, which delimit respective parts of the frusto-conical inner face and which follow one another in juxtaposition along the axis.
- the at least two modules of the outer casing are thermally regulated independently of each other.
- the parts of the frusto-conical inner surface, delimited by the at least two modules, respectively, of the outer casing, are inclined with respect to the axis at respective angles which are different from each other.
- the internal member comprises at least two separate modules, which delimit respective parts of the frusto-conical outer face and which follow one another in juxtaposition along the axis.
- the at least two modules of the internal member are rotatable about the axis independently of each other.
- the at least two modules of the internal member are thermally regulated independently of each other.
- the parts of the frusto-conical outer face, delimited by the at least two modules, respectively, of the internal member, are inclined with respect to the axis at respective angles which are different from each other.
- the frusto-conical inner face of the outer casing and the frusto-conical outer face of the internal member are parallel to each other from the upstream end to the downstream end of the channel.
- the frusto-conical inner face of the outer casing and the frusto-conical outer face of the internal member have respective angulations with respect to the axis which are different from each other at least over an axial part of the channel.
- the distribution chamber is provided with a frusto-conical surface, which is centered on the axis and diverges downstream so as to connect an upstream part of the distribution chamber to the frusto-conical inner face of the outer casing.
- an upstream end of the upstream part of the internal member is at least partially arranged in the diffuser, delimiting, together with the diffuser, the distribution chamber.

The invention will be better understood upon reading the following description, given only as an example and making reference to the drawings, wherein.

Figure 1:
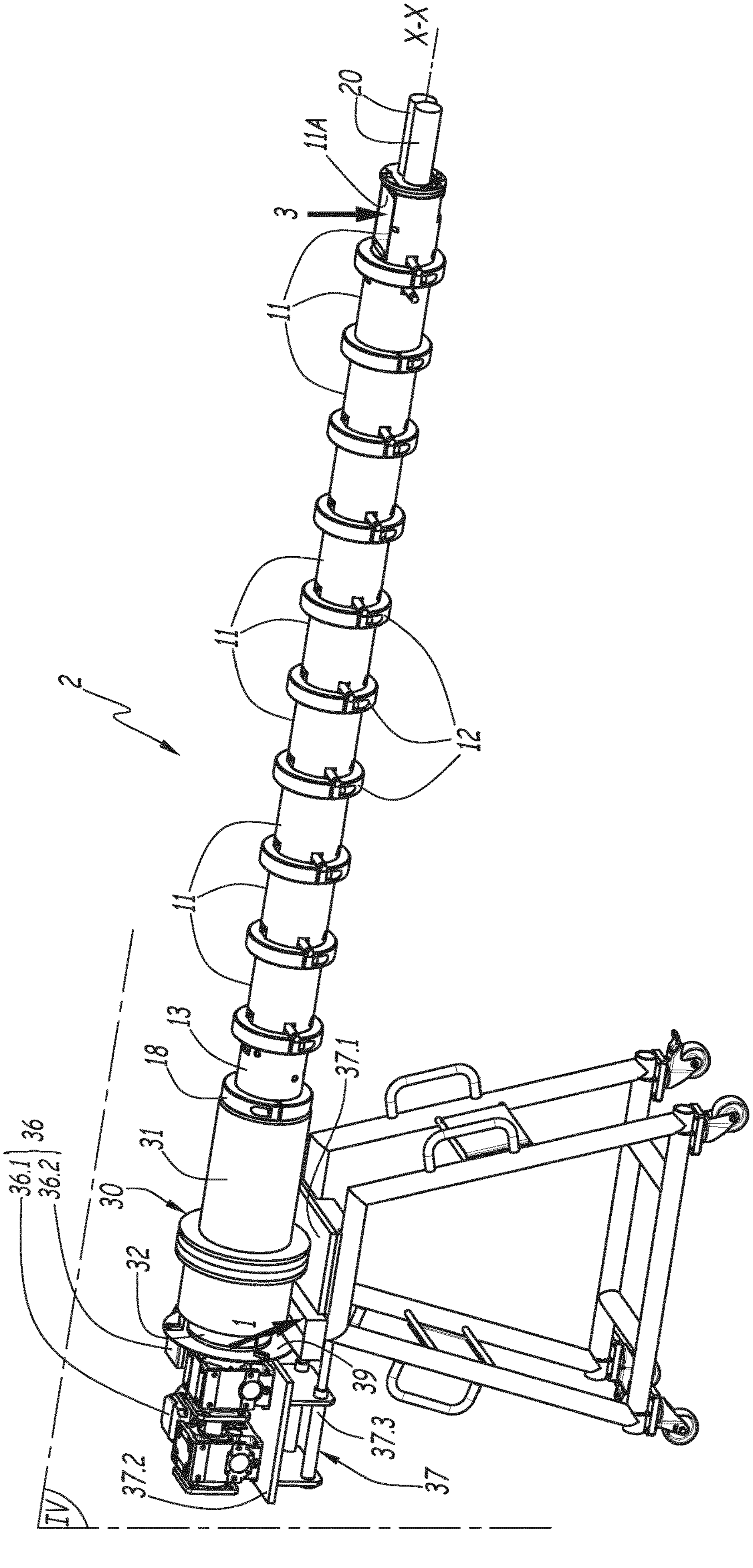
FIG. 1 is a perspective view of a system according to the invention.
Figure 2:
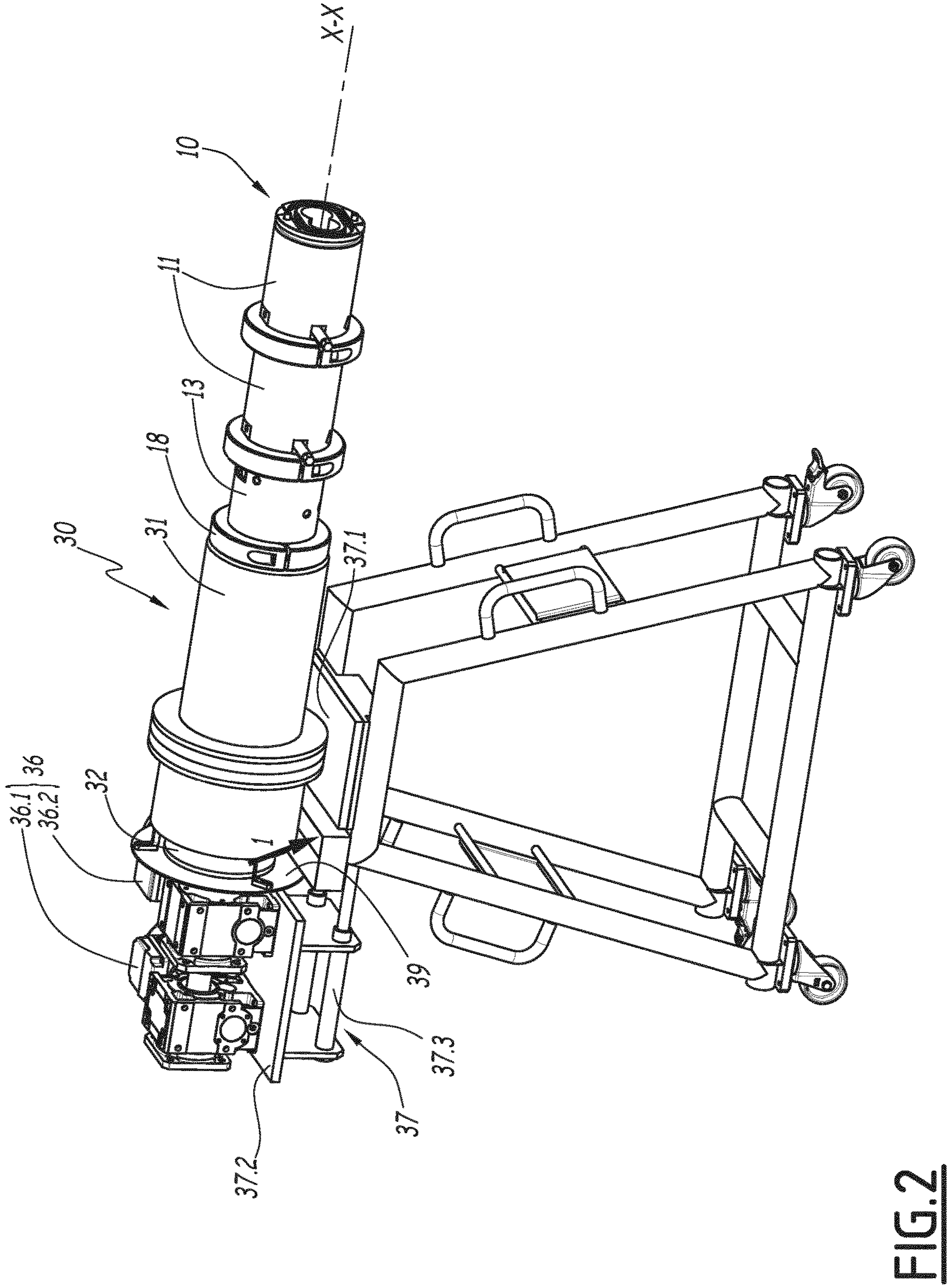
FIG. 2 is a view similar to FIG. 1, showing a part of system in FIG. 1, including a die.

FIGS. 1 to 6 schematically represent a system for continuously preparing, by extrusion, a food product 1 intended for human and/or animal consumption. Such system mainly include an extrusion machine 2, discussed in detail a little further below, and a raw material 3.

The raw material 3 is high protein and water-rich. More precisely, the raw material 3, i.e. all the ingredients which are processed by the extrusion machine 2 so as to form the food product 1, predominantly contains, in other words more than 50%, water and proteins, as well as, minor or even marginal extent, dietary fiber and/or starch, and, if appropriate, fats and additives.

The food product 1, such obtained at the outlet of the extrusion machine 2, is textured, in other words is called a fiber product. The food product 1 comprises between 25 and 90% by weight, preferentially between 50 and 85% by weight, of water and further comprises, by weight out of the entire dry material, between 20 and 90% of proteins.

The proteins of the raw material 3 and hence of the food product 1 are of plant and/or animal origin and/or at least of one other origin. Plant proteins come e.g. from legumes, cereals and/or protein crops (soy, wheat, peas, corn, chickpeas, lentils, etc.). Proteins of animal origin are derived e.g. from fish, meat, milk and/or eggs. The other origin or origins of proteins are e.g. mushrooms, algae, insects, cellular meat, etc.

The food product 1 further comprises, by weight over the total dry matter, between 0 and 50% of dietary fibers and between 0 and 50% of starch, the sum of the dietary fibers and/or starch being preferentially greater than 0.01%. Dietary fibers are e.g. fibers of plant origin and starch e.g. of plant origin, in the native, pregelled or modified state.

The food product 1 can also comprise, by weight out of the entire dry material, between 0 and 20% fats, in particular of plant and/or animal origin, and/or functional ingredients, such as lecithins, caseinates or other ingredients.

The extrusion machine 2 comprises a sleeve 10 with an elongated shape, which extends along a geometric axis X-X and which is centered on the axis. Inside the sleeve 10, two screws 20 extend parallel to the axis X-X, being received in a supplementary longitudinal bore of the sleeve, centered on the axis X-X. In practice, in a manner known per se, each screw includes e.g. a central screw shaft on which a set of screw elements is mounted. The screws extend on both sides of the axis X-X and are interpenetrating, the bore of the sleeve thus having a two-lobed transverse profile, as can be seen clearly in FIG. 2, wherein the screws 20 are omitted.

The screws 20 are designed for being rotated on themselves, about the central axis thereof, by a drive unit, not shown in the figures, engaged with the upstream end of the screws, namely the right-hand end in FIG. 1, emerging outside the sleeve 10.

The screws 20 are designed, due to the threaded profile thereof, for pulling along the raw material 3 inside the sleeve 10 along the axis X-X, from an upstream part of the sleeve 10, into which the ingredients of the raw material 3 are fed inside the central longitudinal bore of the sleeve, as far as the downstream end of the sleeve 10, the terms “upstream” and “downstream” being oriented along the direction of advance of the material in the extrusion machine 2 under the action of the screws 20, the direction of advance being from right to left in FIGS. 1 to 4.

The sleeve 10 includes a plurality of modular elements 11 succeeding one another along the axis X-X. Each of the elements 11 internally delimits a corresponding part of the central longitudinal bore of the sleeve 10, the bore parts being in line with one another, along the axis X-X, in the assembled state of the elements 11, like in the figures. In practice, the elements 11 are assembled in pairs by means of fastening collars 12.

In the example of embodiment considered in the figures, the element furthest upstream among the elements 11 can be used for inserting, inside the central bore part thereof, the ingredients of the raw material 3. To this end, in a manner known per se and not presented in detail herein, the element furthest upstream among the elements 11 is provided with a through hole 11A which, transversely to the axis X-X, opens to the outside the central bore part of said element. More generally, it is understood that, among the different elements 11 of the sleeve 10, one or a plurality of the elements make it possible to feed in, inside the central longitudinal bore of the sleeve 10, the solid and/or liquid ingredients of the raw material 3 intended to be processed by the extrusion machine 2.

As mentioned in the introductory part of the present document, the screws 20 are designed, in addition to pulling along the material to be extruded, for shearing and pressurizing the raw material 3, so as to transform same in an essentially mechanical way. Since such aspect of the extrusion machine 1 is well known in the field, same will not be further discussed herein. Similarly, also as mentioned in the introductory part, the sleeve 10 is designed for regulating the temperature of the material to be extruded along the sleeve so as to transform the material in an essentially thermal way. To this end, all or part of the elements 11 of the sleeve 10 are thermally regulated and/or allow steam to be injected into the sleeve and/or allow the material being extruded into the sleeve to be degassed. Herein again, such aspect of the extrusion machine 1 being well known in the field, it will not be described hereinafter. More generally, the sleeve 10 and the screws 20 are designed for applying a thermomechanical treatment to the raw material 3 as said material advances from the upstream end of the sleeve to the downstream end of the sleeve. The material resulting from such thermomechanical treatment and leaving the sleeve 10 is identified by 4.

At the downstream end thereof, the sleeve 10 comprises an end plate 13, commonly referred to as the “front plate” in the field. The end plate 13 is directly mounted in a fixed manner, e.g. by means of a fastening collar 14, to the downstream end of the element furthest downstream, among the elements 11 of the sleeve 10. As can be seen clearly in FIG. 4, the end plate 13 internally defines a through bore 15 which is centered on the axis X-X, extending along the axial continuation of the central bore part of the element furthest downstream among the elements 11, and which receives, where appropriate, the downstream end of the screws 20. The bore 15 is suitable for channeling the material 4 pushed downstream by the screws 20 so as to provide appropriate pressurization and filling ratio for the central longitudinal bore of the sleeve 10. For this purpose, the bore 15 is e.g. at least partially choked downstream and provided with a transverse grid 16. Since such aspect of the extrusion machine 2 does not limit the scope of the invention, such aspect will not be described hereinafter.

The extrusion machine 2 further comprises a die 30 which, in the assembled state of the extrusion machine 2, is arranged at the downstream end of the sleeve 10. The die 30 is designed for letting through the material 4 so that said material is extruded. Thereby, in the assembled state of the extrusion machine 1, the material 4 coming out of the sleeve 10 is forced, under the action of the screws 20, to flow through the die 30.

As can be seen clearly in FIGS. 2 to 6, the die 30 includes an outer casing 31 and an internal member 32.

The outer casing 31 is tubular, being centered on a geometric axis which, in the assembled state of the extrusion machine 2, coincides with the axis X-X and which will hence be considered thereafter as being the axis X-X. The outer casing 31 thereby has two opposite ends along the axis X-X, namely an upstream end 31A and a downstream end 31B. Because of the tubular shape thereof, the outer casing 31 has an inner face 33, i.e. a face turned towards the axis X-X, which is frusto-conical, centered on the axis X-X and divergent towards the downstream. In the example of embodiment considered in the figures, the frusto-conical inner face 33 extends between the upstream end 31A and downstream end 31B of the outer casing 31, coming out at the downstream end 31B. As for the external face of the external casing 31, the geometrical specificities thereof are not limiting.

The internal member 32 as well has an elongated shape, centered on a geometric axis which, in the assembled state of the extrusion machine 2, coincides with the axis X-X and which will hence be considered thereafter as being the axis X-X. In the assembled state of the extrusion machine 2, the internal member 32 is coaxial with the external casing 31, being partially arranged inside the latter. The internal member 32 thereby includes two parts that follow one another along the axis X-X, namely an upstream part 32A which extends at least partially inside the outer casing 31, and a downstream part 32B which extends entirely outside the outer casing 31. In the embodiment considered in the figures, the upstream part 32A of the internal member 32 extends essentially inside the external casing 31, while emerging, towards the downstream, from the downstream end 31B of the external casing 31. In all cases, the upstream part 32A of the internal member 32 has an outer face 34, i.e. a face turned opposite from the axis X-X, which is frusto-conical, centered on the axis X-X and divergent towards the downstream. In the embodiment considered in the figures, the frusto-conical outer face 34 extends over substantially the entire axial extent of the upstream part 32A of the internal member 32, emerging, towards the downstream, from the downstream end 31B of the outer casing 31.

The frusto-conical inner face 33 of the outer casing 31 and the frusto-conical outer face 34 of the internal member 32 delimit therebetween, a channel 35 extending along the axis X-X from an upstream end 35A of the channel 35, turned towards the sleeve 10, to a downstream end 35B of the channel 35, opposite the sleeve 10. The frusto-conical inner face 33 of the outer casing 31 delimits the channel 35 by forming the outer periphery of the channel, from the upstream end 35A to the downstream end 35B of the channel. The frusto-conical outer face 34 of the internal member 32 delimits the channel 35 by forming the inner periphery of the channel, from the upstream end 35A to the downstream end 35B of the channel. Given the coaxiality and the frusto-conical geometry of the inner 33 and outer 34 sides delimiting same, the channel 35 has, throughout the axial extent between upstream 35A and downstream 35B ends thereof, a cross-section, i.e. a cross-section perpendicular to the axis X-X, which is annular and centered on the axis X-X, as can be seen clearly in FIGS. 5 and 6. As can be seen clearly in FIGS. 5 and 6, the channel 35 extends continuously around the axis X-X, i.e. over 360°. In service, the material 4 coming from the sleeve 10 flows into the channel 35 in order to cross through the die 30, advancing in the channel 35 from the upstream end 35A to the downstream end 35B of the channel. The material flowing in the channel 35 is identified by 5.

In the embodiment considered in the figures, the frusto-conical inner face 33 presents an angulation, with respect to the axis X-X, which is constant from the upstream end 35A to the downstream end 35B of the channel 35: in other words, in a section in a plane containing the axis X-X, whatever the plane considered about the axis X-X, the frusto-conical inner face 33 forms a rectilinear segment which is inclined at an angle α with respect to the axis X-X. Thereby, the face 33 consists of a single truncated cone the half-angle at the apex of which is α. Similarly, the frusto-conical outer face 34 has an angulation, with respect to the axis X-X, which is constant from the upstream end 35A to the downstream end 35B of the channel 35: in a section in a plane containing the axis X-X, and whatever the plane considered about the axis X-X, the frusto-conical outer face 34 forms a rectilinear segment which is inclined at an angle β with respect to the axis X-X. Thus, this face 34 is constituted by a single truncated cone the half-angle at the apex of which is β.

Also, in the embodiment considered in the figures, the frusto-conical inner face 33 and the frusto-conical outer face 34 are parallel to each other from the upstream end 35A to the downstream end 35B of the channel 35. In other words, the frusto-conical inner face 33 and the frusto-conical outer face 34 have the same angulation with respect to the axis X-X, which herein is equivalent to saying that the angles α and β are equal. As a result, the channel 35 has a thickness, i.e. a dimension along a direction normal to the faces 33 and 34, which is constant from the upstream end 35A thereof to the downstream end 35B. As a result, the passage section of the channel 35, i.e. the cross-sectional area of the channel 35, increases continuously from the upstream end 35A thereof to the downstream end 35B thereof. In practice, it should be understood that the value of the thickness of the channel 35 and, thereby, the value of the passage section of the channel are directly dependent on the relative positioning between the outer casing 31 and the internal member 32 along the axis X-X.

According to an advantageous optional arrangement, which is implemented in the embodiment considered in the figures and advantages of which will become apparent thereafter, the outer casing 31 comprises a plurality of distinct modules, which delimit respective parts of the frusto-conical inner face 33, the parts following one another along the axis X-X in a juxtaposed way. Herein, the outer casing 31 thereby comprises two such modules 31.1 and 31.2 which delimit respective parts of the frusto-conical inner face 33, namely an upstream part 33.1 and a downstream part 33.2 of the frusto-conical inner face 33. In the example of embodiment illustrated in the figures, the upstream 33.1 and downstream 33.2 parts of the frusto-conical inner face 33 extend in the rectilinear extension of each other, according to the aforementioned angulation of the frusto-conical inner face 33 with respect to the axis X-X.

Similarly, according to an advantageous optional arrangement, which is implemented in the embodiment considered in the figures and advantages of which will become apparent thereafter, the internal member 32 comprises a plurality of distinct modules which delimit respective parts of the frusto-conical outer face 34, the respective parts following one another along the axis X-X in a juxtaposed way. Herein, the internal member 32 comprises two such modules 32.1 and 32.2 which delimit respective parts of the frusto-conical outer face 34, namely an upstream part 34.1 and a downstream part 34.2 of the frusto-conical outer face 34. In the example of embodiment illustrated in the figures, the upstream 34.1 and downstream 34.2 parts of the frusto-conical outer face extend in the rectilinear continuation of each other, according to the aforementioned angulation of the frusto-conical outer face 34 with respect to the axis X-X.

Whichever the embodiment thereof, the outer casing 31 is designed for being fixedly connected to the sleeve 10 in the sense that, in the assembled state of the extrusion machine 2, the sleeve 10 and the outer casing 31 are fixedly connected to each other. In practice, the outer casing 31, in particular the upstream part 32A thereof, is for such purpose fixedly, rigidly attached, either directly or indirectly, to a downstream part of the sleeve 10, more particularly to the end plate 13 of said sleeve. In the embodiment considered in the figures, the downstream part of the sleeve 10, more particularly the end plate 13, is thereby fixedly, rigidly attached to the module 31.1 of the outer casing, the latter being as such fixedly rigidly attached to the module 31.2 of the outer casing.

As shown in the figures, the end plate 13 continues, towards the downstream, by means of a diffuser 17 which provides the fixed link between the outer casing 31 and the end plate 13. For example, the outer casing 31, more particularly the module 31.1 of the latter, is mechanically rigidly attached, by any appropriate means, to the diffuser 17, the latter being in particular fitted inside the outer casing 31, at the upstream end 32A of the latter, whereas the diffuser 17 is directly mounted pressed against the end plate 13, in the axial continuation of the latter, and is held fixedly against the end plate 13 by means of a fastening collar 18.

Whatever the specificities of the diffuser 17, which make possible the fixed connection between the die 30 and the sleeve 10, the diffuser 17 advantageously delimits a distribution chamber 17A for the material 4 coming out of the sleeve, at the junction between the sleeve and the die 30. In the assembled state of the extrusion machine 2, the distribution chamber 17A connects the downstream end of the bore 15 of the end plate 13 to the upstream end 35A of the channel 35. The distribution chamber 17A thereby makes the material which emerges from the end plate 13 centered on the axis X-X 4, flow to the upstream end 35A of the channel 35. For the material entering the upstream end 35A of the channel 35 to be distributed over the entire extent, around the axis X-X, of the upstream end 35A, the distribution chamber 17A is shaped so as to distribute the material around the axis X-X into the upstream end 35A of the channel 35: for this purpose, in the example shown in the figures, the distribution chamber 17A is provided with a frusto-conical surface 17B, which is centered on the axis X-X and diverges downstream, linking an upstream part of the distribution chamber 17A to the inner frusto-conical face 33 of the outer casing 31.

Whatever the embodiment thereof, the internal member 32 is, unlike the outer casing 31, not intended to be fixed with respect to the sleeve 10, but is intended to rotate about the axis X-X. Thereby, within the die 30, the internal member 32 is mounted apt to rotate about the axis X-X with respect to the outer casing 31. Thereby the frusto-conical outer face 34 of the internal member 32 rotates on its own axis about the axis X-X.

For the purpose of rotating the internal member 32 about the axis X-X, the die 30 comprises a motor 36 which is coupled to the downstream part 32B of the internal member 32. In practice, the technical specificities of the motorization 36 and of the coupling of the latter to the downstream part 32B of the internal member 32 are not limiting. As an example, the motorization 36 is electric and the output of the motorization is, outside the outer casing 31, in either direct or indirect engagement with the downstream part 32B of the internal member 32.

In the context of the optional arrangement presented hereinabove, wherein the internal member 32 comprises a plurality of distinct modules, the latter are advantageously provided to rotate about the axis X-X independently of one another. Thereby, herein, each of the parts 32.1 and 32.2 can rotate independently of the other part, so that the parts 32.1 and 32.2 can rotate about the axis X-X at respective speeds which are different from each other and/or in respective directions which are opposite to each other. To this end, the motorization 36 includes two motors 36.1 and 36.2 which are specific to the module 32.1 and the module 32.2, respectively, of the internal member 32: the motor 36.1 is designed to rotate the module 32.1 about the axis X-X whereas the motor 36.2 is designed to rotate the module 32.2 about the axis X-X.

As an example of a possible embodiment of the modules 32.1 and 32.2 of the internal member 32, which is implemented in the figures, the module 32.1 comprises, on the one hand, a central shaft 32.3, which is centered on the axis X-X, and of which an upstream part, belonging to the upstream part 32A of the internal member 32 is arranged inside the outer casing 31 whereas a downstream part of the central shaft 32.3, belonging to the downstream part 32B of the internal member 32, is located outside the outer casing 31 where same is coupled to the motor 36.1, and, on the other hand, a stage-forming part 32.4, which belongs to the upstream part 32A of the internal member 32 and which is arranged inside the outer casing 31, being rigidly attached to the upstream part of the central shaft 32.3. The stage-forming part 32.4 delimits the upstream part 34.1 of the frusto-conical outer face 34. The module 32.2 includes, on the one hand, a tubular shaft 32.5, which is centered on the axis X-X and of which an upstream part, belonging to the upstream part 32A of the internal member 32, is arranged inside the outer casing 31 whereas a downstream part of the tubular shaft 32.5 belongs to the downstream part 32B of the internal member 32 and is arranged outside the outer casing 31 where same is coupled to the motor 36.2, and, on the other hand, a stage-forming part 32.6, which belongs to the upstream part 32A of the internal member 32 and is arranged inside the external casing 31, being rigidly attached to the upstream part of the tubular shaft 32.5. The stage-forming part 32.6 delimits the downstream part 34.2 of the frusto-conical outer face 34. The central shaft 32.3 extends inside the tubular shaft 32.5, with radial interposition of one or a plurality of bearings 32.7 between the shafts 32.3 and 32.5, in particular between the respective upstream part thereof and between the respective downstream part thereof. The stepping parts 32.4 and 32.6 are immediately adjacent to each other along the axis X-X, with axial interposition, where appropriate, of a decoupling interface between the stepping parts, not shown in the figures.

According to a possible arrangement, which is implemented in the figures, the upstream end of the upstream part 32A of the internal member 32 is at least partially arranged in the diffuser 17, delimiting, together with the latter, the distribution chamber 17A. In the example envisaged in the figures, the upstream end of the upstream part 32A of the internal member 32 forms a tip 32.8 having a conical surface 32.8A, centered on the axis X-X and divergent towards the downstream. Herein, the tip 32.8 belongs to the module 32.1. The conical surface 32.8A is arranged inside the frusto-conical surface 17B of the diffuser 17 so as to provide the distribution chamber 17A between the conical surface 32.8A and the frusto-conical surface 17B.

Moreover, regardless of the embodiment of the outer casing 31 and of the internal member 32, one and/or the other of the outer casing 31 and of the upstream part 32A of the internal member 32 are thermally regulated. In the example presented herein, it is considered that the outer casing 31 is thermally regulated and the upstream part 32A of the internal member 32 is thermally regulated, being understood that in a variant, only one of the two is thermally regulated but not the other. Thereby, herein, the outer casing 31 and the upstream part 32A of the internal member 32 are each designed to control the temperature thereof so as to maintain same at least locally, at a determined value, advantageously adjustable, despite the heat exchanges with the immediate environment thereof. More particularly, the outer casing 31 is apt to act on the temperature in the channel 35, more precisely on the temperature of the material 5 flowing through the channel 35, by means of an exchange of heat between the material 5 and the outer casing 31 through the frusto-conical inner face 33. Similarly, the upstream part 32A of the internal member 32 is apt to act on the temperature in the channel 35, more precisely on the temperature of the material 5 flowing through the channel, by means of an exchange of heat between the material 5 and the upstream part 32A of the internal member 32 through the frusto-conical outer face 34.

In the context of the optional arrangement presented hereinabove, wherein the outer casing 31 comprises a plurality of distinct modules, the latter are advantageously thermally regulated independently of one another. To this end, in the example of embodiment shown in the figures, the modules 31.1 and 31.2 of the outer casing 31 are each provided with a conduit 31.3, 31.4 for the circulation of a thermoregulating fluid, e.g. water under pressure. The conduit 31.3 of the module 31.1 extends around and along the axis X-X and surrounds the upstream part 33.1 of the frusto-conical inner face 33, being separated therefrom by a heat-conducting wall of the module 31.1. The conduit 31.4 extends around and along the axis X-X and surrounds the downstream part 33.2 of the frusto-conical inner face 33, being separated therefrom by a heat-conducting wall of the module 31.2. In operation, each of the conduits 31.3 and 31.4 is fed with a thermoregulating fluid and makes the latter flow overall along the direction of the axis X-X so as to apply a temperature profile along the part of the channel 35 delimited by the upstream 33.1 and downstream 33.2 parts, respectively, of the frusto-conical inner face 33, in particular so that the temperature of the material 5 flowing through the channel 35 is adjusted, e.g. lowered or maintained constant, progressively as the material 5 advances through the channel towards the downstream. Of course, each of the modules 31.1 and 31.2 of the outer casing 31 includes a thermoregulating fluid inlet for feeding the conduit 31.3, 31.4, respectively, from outside the outer casing 31, and a thermoregulating fluid outlet for discharging the thermoregulating fluid towards the outside of the outer casing, from the corresponding conduit, the thermoregulating fluid inlets and outlets of the modules 31.1 and 31.2 not being shown in the figures. Insofar as the conduits 31.3 and 31.4 are distinct, the conduits can advantageously apply respective temperature profiles which are different from each other, e.g. by providing that the material 5 flowing through the channel 35 is cooled more by heat exchange at the module 31.1 than by heat exchange at the module 31.2.

Of course, the embodiment which has just been described in connection with the modules 31.1 and 31.2, is only one possibility of embodiment of, more generally, means of thermoregulation for the outer casing 31, suitable for applying a temperature profile along the channel 35 from the upstream end 35A thereof to the downstream end 35B thereof, in particular so that the temperature of the material 5 flowing through the channel 35 is adjusted, e.g. lowered or maintained constant, progressively as the material advances through the channel towards the downstream.

In the context of the optional arrangement presented hereinabove, wherein the internal member 32 includes a plurality of distinct modules, the latter are advantageously thermally regulated independently of one another. Thereby, in the example of embodiment considered herein, the modules 32.1 and 32.2 of the internal member 32 each include a conduit 32.9, 32.10 for the circulation of a thermoregulating fluid, e.g. water under pressure. The conduit 32.9 extends around and along the axis X-X and is surrounded by the upstream part 34.1 of the frusto-conical outer face 34, being separated therefrom by a heat-conducting wall of the module 32.1. The conduit 32.9 is e.g. delimited between the central shaft 32.3 and the stage-forming part 32.4. The conduit 32.10 extends around and along the axis X-X and is surrounded by the downstream part 34.2 of the frusto-conical outer face 34, being separated therefrom by a heat-conducting wall of the module 32.2. The conduit 32.10 is e.g. delimited between the tubular shaft 32.5 and the stage-forming part 32.6. In operation, each of the conduits 32.9 and 32.10 is fed with a thermoregulating fluid and makes the latter flow overall along the direction of the axis X-X so as to apply a temperature profile along the part of the channel 35 surrounded by the upstream 34.1 and downstream 34.2 parts respectively, of the frusto-conical outer face 34, in particular so that the temperature of the material 5 flowing through the channel 35 is adjusted, e.g. lowered or maintained constant, progressively as same advances through the channel towards the downstream. Of course, each of the conduits 32.1 and 32.2 includes a thermoregulating fluid inlet for feeding the corresponding conduit 32.9, 32.10, respectively, from outside the internal member 32, and a thermoregulating fluid outlet for discharging the thermoregulating fluid from the corresponding conduit towards the outside of the internal member 32, the thermoregulating fluid inlets and outlets of the modules 32.1 and 32.2 not being shown in the figures. In practice, given the rotary mounting of the modules 32.1 and 32.2 about the axis X-X, the aforementioned thermoregulating fluid inlets and outlets incorporate e.g. rotating joints. Insofar as the conduits 32.9 and 32.10 are distinct, the conduits can advantageously apply respective temperature profiles which are different from each other, e.g. by providing that the material 5 flowing through the channel 35 is cooled more by an exchange of heat at the module 32.1 than by an exchange of heat at the module 32.2.

Figure 3:
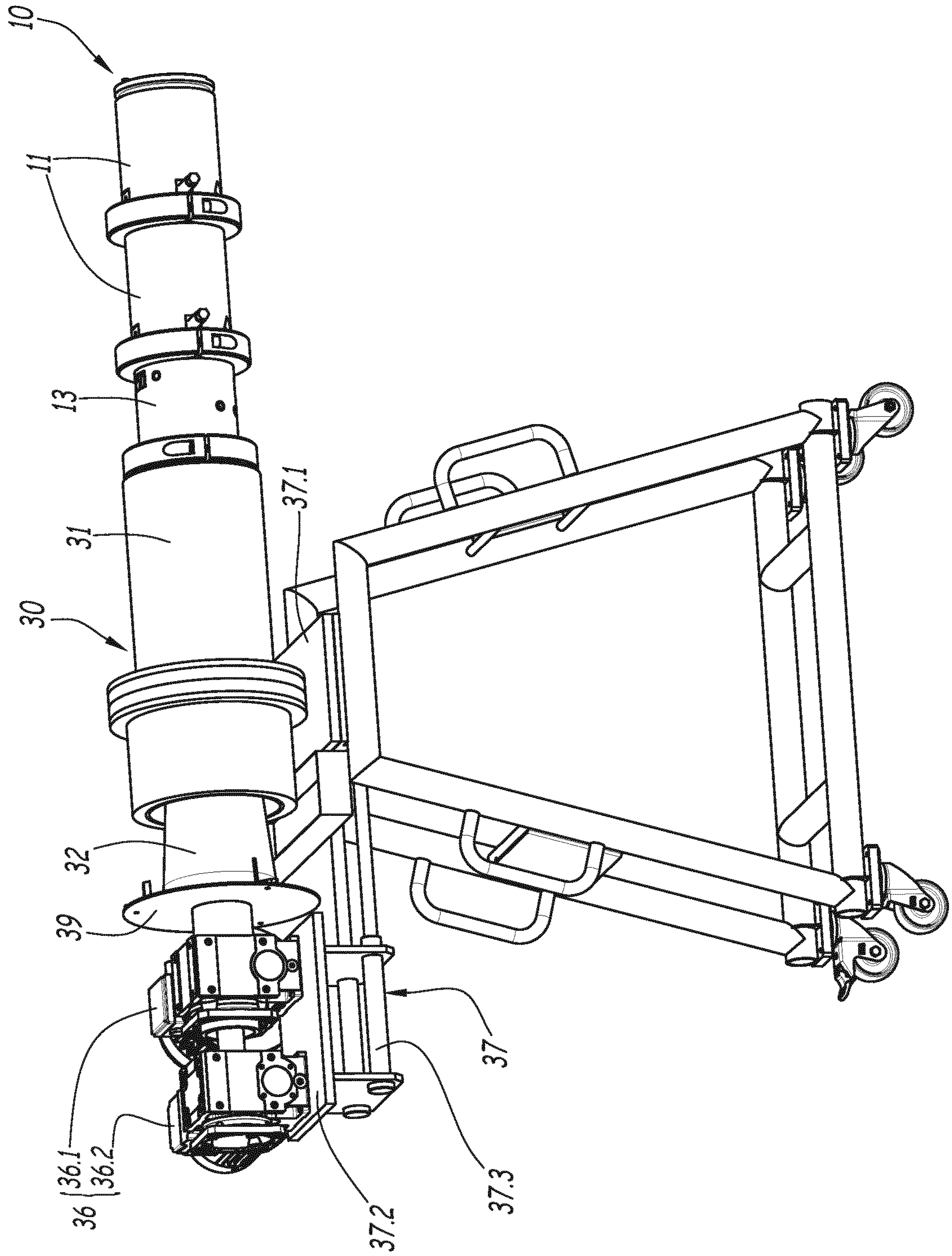
FIG. 3 is a view similar to FIG. 2, illustrating the die from a different angle of observation than the angle of observation in FIG. 2 and in a different operation state than the operation state shown in FIG. 2.
Figure 4:
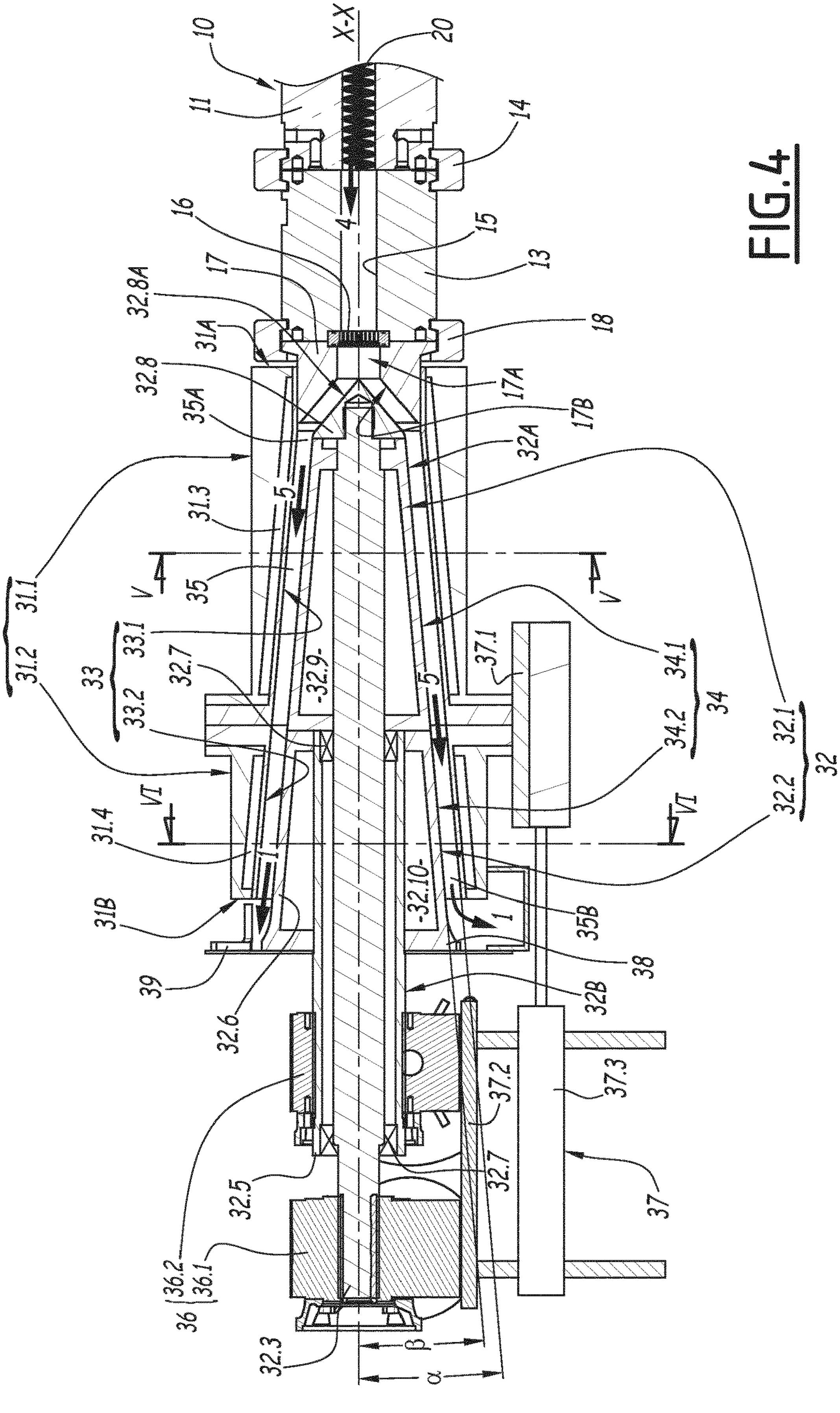
FIG. 4 is a schematic partial longitudinal section in the plane IV shown in FIG. 1.
Figure 5:
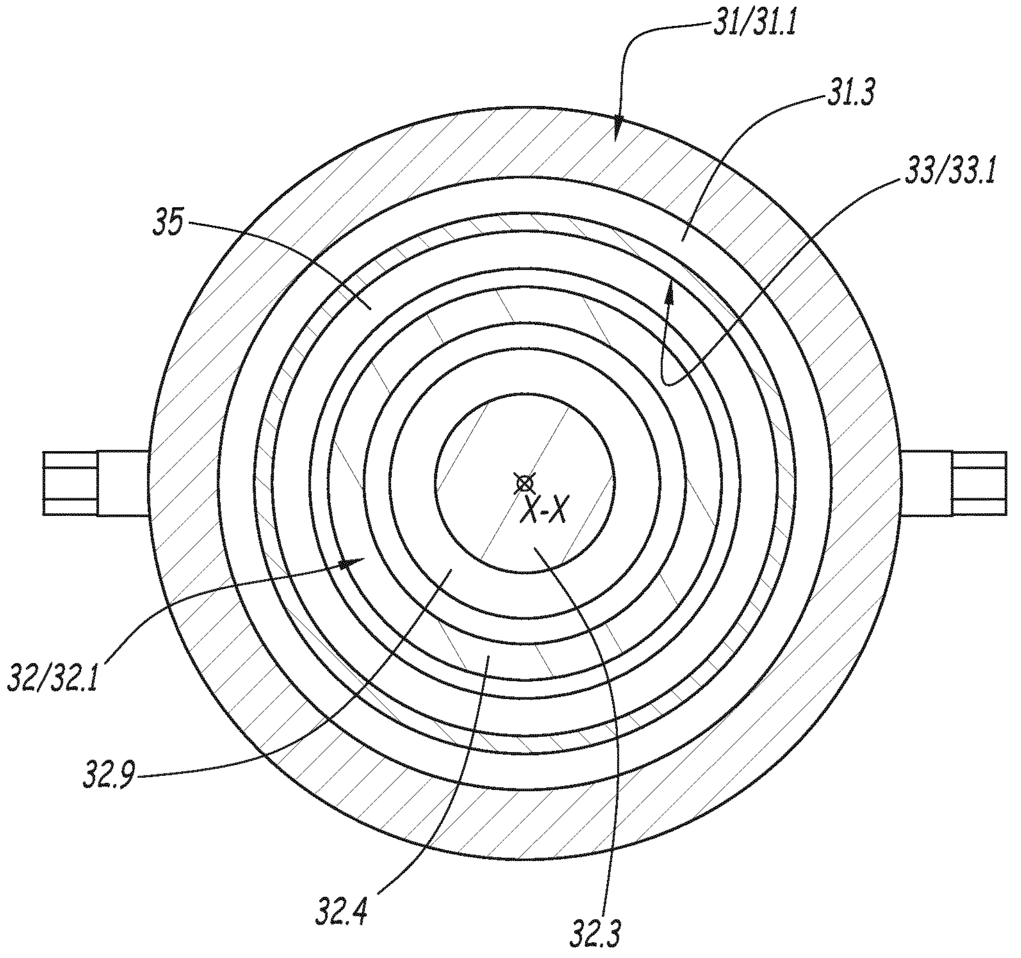
FIG. 5 is a section along the line V-V shown in FIG. 4.
Figure 6:
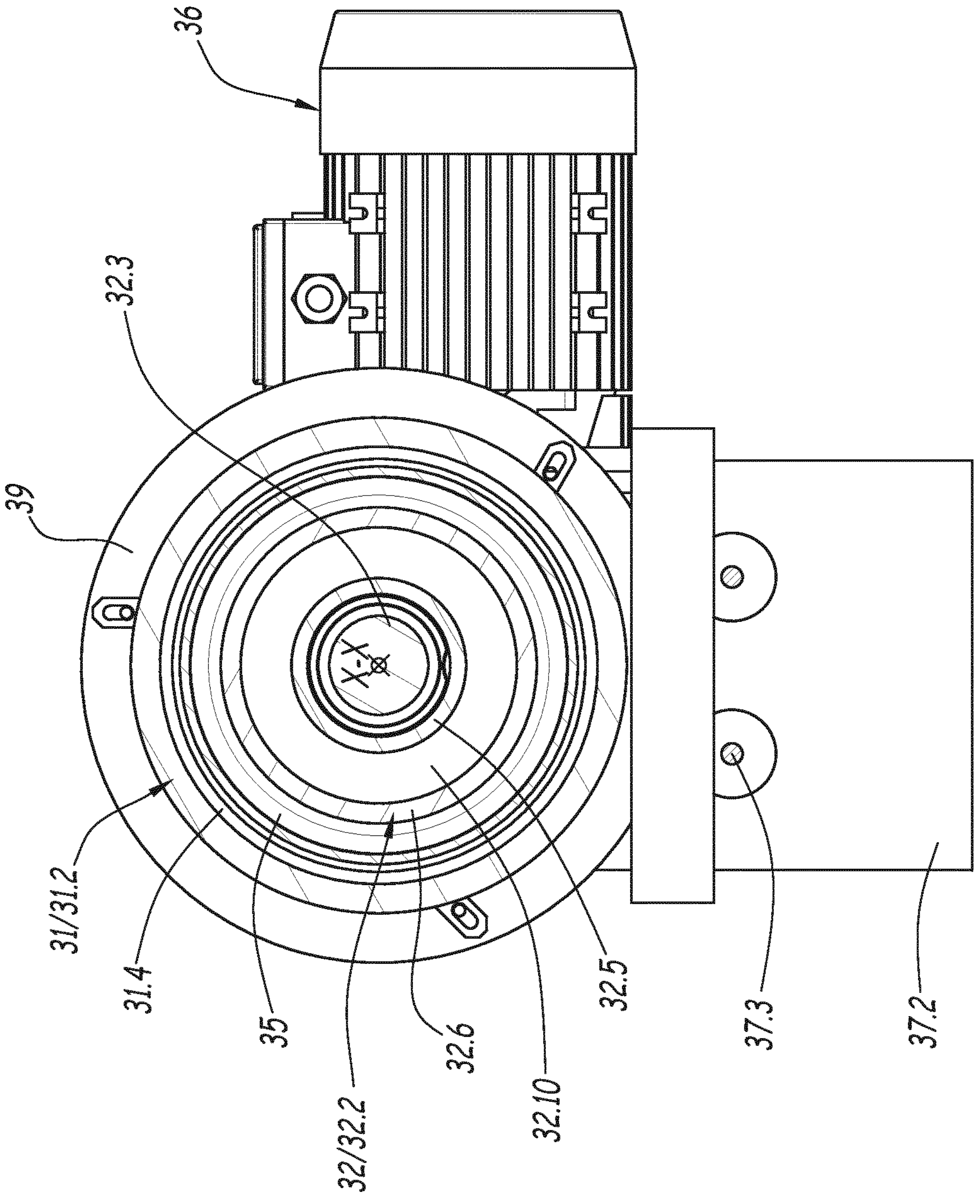
FIG. 6 is a section along the line VI-VI shown in FIG. 4.

Of course, the embodiment which has just been described in connection with the conduits 32.1 and 32.2, is only one possibility of embodiment of, more generally, means of thermoregulation of the upstream part 32A of the internal member 32, suitable for applying a temperature profile along the channel 35 from the upstream end 35A thereof to the downstream end 35B thereof, in particular so that the temperature of the material 5 is lowered or maintained constant progressively as the said material advances through the channel 35 towards the downstream, Whatever the embodiment of the outer casing 31 and of the internal member 32, the die 30 optionally includes a particularly advantageous supplementary arrangement, which is illustrated in the figures and according to which the position of the internal member 32 with respect to the outer casing 31 along the axis X-X can be modified in an adjustable way by an ad hoc adjustment device 37. FIG. 3 thereby illustrates the die 30 in a configuration wherein the internal member 32 occupies a position along the axis X-X which is more offset towards the downstream with respect to the external casing 31, compared to the position occupied by the internal member 32 in the configuration illustrated by the other figures. In practice, the adjustment device 37 has many possible embodiments. In the example considered in the figures, the adjustment device 37 comprises an upstream base 37.1, which is fixedly connected to the outer casing 31 along the axis X-X, a downstream base 37.2, which is fixedly connected to the internal member 32 along the axis X-X, and a spacing mechanism 37.3 which connects the upstream 37.1 and downstream 37.2 bases and which is designed to move the latter apart in an adjustable way along the axis X-X. Herein, the spacing mechanism 37.3 comprises e.g. one or a plurality of hydraulic or mechanical cylinders, but such example of embodiment is not limiting. The upstream base 37.1 is e.g. fixedly rigidly attached to the outer casing 31, in particular to one and/or the other of the modules 31.1 and 31.2, by any appropriate means. The downstream base 37.2 is advantageously designed e.g. to support, fixedly along the axis X-X, the motorization 36 and the downstream part 32B of the internal member 32 which is coupled to the latter.

Whatever the embodiment of the adjustment device 37, the latter serves to control the position, along the axis X-X, of the internal member 32 with respect to the outer casing 31. The advantages of such arrangement of the die 30 are multiple. Thereby, as explained hereinabove, by modifying the relative positioning of the internal member 32 of the outer casing 31 along the axis X-X, the geometrical features of the channel 35, such as the thickness thereof and the passage cross-section thereof, are modified. Moreover, the cleaning of the channel 35 and/or the maintenance of the die 30 are facilitated when the internal member 32 can be moved substantially away from the outer casing 31 towards the downstream. In practice, the adjustment device 37 can be actuated while the extrusion machine 2 is shut off and/or while the extrusion machine 2 is in operation. The corresponding actuation of the adjusting device 37 is manual or is subject to an operating instruction which is predetermined or calculated in real time from measurements relating to operation parameters of the extrusion machine 2, such as e.g., the resistive torque of the screws 20, and/or from measurements relating to features of the material treated by the extrusion machine 2, such as e.g. the composition of the raw material 3 or the viscosity of the material 2 coming out 4 from the sleeve 10.

According to another possible arrangement, also implemented in the embodiment considered in the figures, the die 30 includes an outlet deflector 38 which is fixedly connected to the internal member 32. Thereby, the outlet deflector 38 is, together with the internal member 32, rotatable about the axis X-X with respect to the outer casing 31. The embodiment for the fixed connection between the outlet deflector 38 and the internal member 32 is not limiting the invention: herein, the outlet deflector 38 is integrated into the upstream part 32A of the internal member 32, in particular into the stage-forming part 32.6 of the module 32.2 of the internal member 32. In any case, the outlet deflector 38 is arranged at the downstream end 35B of the channel 35 so as to exert a counter-pressure with respect to the flow of the material coming out of the channel 35. In practice, along the axis X-X, the deflector 38 can occupy either exactly the same position as the downstream end 35B of the channel 35 or be slightly offset downstream of the downstream end 35B as in the example envisaged in the figures. In any case, the outlet deflector 38 is designed to physically interfere, along the direction of the axis X-X, with the material 5 coming out of the channel 35 via the downstream end 35B of the latter. In other words, the outlet deflector 38 induces an axial resistance to the flow of the material 5 coming out of the channel 35. To this end, the outlet deflector 38 is e.g. flared downstream, with respect to the frusto-conical outer face 34 of the internal member 32.

The operation of the extrusion machine 2 will now be described.

The ingredients of the raw material 3 are fed into the sleeve 10 via at least one of the elements 11 thereof, then are pulled along downstream by the screws 20, while being transformed under the effect of the thermomechanical treatment applied by the sleeve and the screws. The material 4 coming out of the element furthest downstream, among the elements 11 of the sleeve 10, is pushed successively through the end plate 13, the diffuser 17 and the die 30. The material 4 enters the die 30 after having passed through the distribution chamber 17A wherein the material 4 is advantageously distributed about the axis X-X by the diffuser 17. Inside the die 30, the material 5 flows through the channel 35, from the upstream end 35A of the latter to the downstream end 35B thereof. After having been, where appropriate, retained by counter-pressure under the effect of the outlet deflector 38, the material 5 emerges at the outside of the outer casing 31 via the downstream end 35B of the channel 35. By escaping thereby to the outside of the outer casing 31, the material 5 emerges from the die 30 and forms the food product 1.

Progressively as same flows along the channel 35, the material 5 being sheared by two different shear components, which cumulate, namely:

- a first shear component, which results from the adhesion of the material 5 to the frusto-conical inner face 33 of the outer casing 31 and/or to the frusto-conical outer face 34 of the internal member 32, due to the temperature adjustment applied by the outer casing 31 and/or the internal member 32 to the material 5 through the faces 33 and 34 thereof, and
- a second shearing component, which results from the winding of the material 5 around the frusto-conical outer face 34 of the internal member 32, due to the rotation about the axis X-X of the internal member 32 by the motorization 36.

Therefrom results a substantial fibration of the material 5 flowing in the channel 35, the fibration being carried out under the double effect of the adjustment of temperature of the material 5, controlled by the thermoregulation of the outer casing 31 and/or of the internal member 32, and of the winding of the flow of the material 5, caused by the rotation of the internal member 32. Thereby, when emerging from the channel 35, the food product 1 exhibits qualitative and quantitative texturing, even if, because of the limited axial dimension of the channel 35, the processing time thereof in the die 30 is short, in particular compared to existing dies used to obtain similar texturing. The extrusion machine 2 thus serves to continuously prepare, from the raw material 3, the food product 1 with different fibrous structures.

It is possible to modify the shear rate applied to the material 5 flowing in the channel 35 and thus to modify the features of the fibration of the material 5, by acting on:

the speed of rotation of the internal member 32, more particularly the respective speeds of the modules 32.1 and 32.2 of the internal member, and/or the direction of rotation of the internal member 32, in particular the respective directions of rotation of the modules 32.1 and 32.2, and/or the temperature profile applied by the means of thermoregulation of the outer casing 31, more particularly the temperature profiles applied by the conduits 31.3 and 31.4, respectively, of the modules 31.1 and 31.2 of the outer casing 31, and/or the temperature profile applied by the means of thermoregulation of the internal member 32, more particularly the temperature profiles which are applied by the conduits 32.9 and 32.10, respectively, of the modules 32.1 and 32.2 of the internal member 32, and/or the position of the internal member 32 in relation to the outer casing 31 along the axis X-X.

Thereby, by controlling the thermoregulation performed by the outer casing 31 and/or by the internal member 32 and/or by controlling the rotation of the internal member 32 by means of the motorization 36 and/or by controlling the axial position adjusted by the adjustment device 37, the die 30 is controllable in the sense that the die serves to obtain a food product 1 having various textures, in a controlled and reproducible manner.

Moreover, various fittings and variants of the extrusion machine 2 described up to now, are conceivable. As examples, we list hereinafter various corresponding aspects, which can be considered alone together with the foregoing or in combination with each other:

Unlike the embodiment illustrated in the figures, where the respective angulations, with respect to the axis X-X, of the frusto-conical inner face 33 and of the frusto-conical outer face 34 being constant between the upstream 35A and downstream 35B ends of the channel 35, an alternative consists in providing that one and/or the other of the faces 33 and 34 each has at least two parts which are inclined with respect to the axis X-X with respective angles which are different from each other. The above is equivalent to saying that, unlike the embodiment illustrated wherein each of the faces 33 and 34 consists of a single truncated cone, one and/or the other of the faces 33 and 34 then consists of at least two coaxial truncated cones, which follow one another along the axis X-X in a juxtaposed way and the respective vertex angles are different from each other. In the case where the frusto-conical inner face 33 of the outer casing 31 thereby consists of such truncated cones, a practical and economical embodiment consists in that the different truncated cones are delimited, respectively, by separate modules of the outer casing 31, such as the modules 31.1 and 31.2: in such case, the parts of the frusto-conical inner face 33 delimited by the modules 31.1 and 31.2, respectively, are inclined with respect to the axis X-X with respective angles which are different from each other and the respective values of which increase downstream. Similarly, in the case where the frusto-conical outer face 34 thereby consist of such truncated cones, a practical and economical embodiment consists in that the different truncated cones are delimited by distinct modules, respectively, of the internal member 32, such as modules 32.1 and 32.2: in such case, the upstream 34.1 and downstream 34.2 parts of the frusto-conical outer face 34, delimited by the modules 32.1 and 32.2, respectively, are inclined with respect to the axis X-X at respective angles which are different from each other and the respective values of which increase towards the downstream.

Unlike the embodiment illustrated in the figures, where the frusto-conical inner face 33 and the frusto-conical outer face 34 are parallel to each other from the upstream end 35A to the downstream end 35B of the channel 35, an alternative consists in providing for the faces 33 and 34 to have respective angulations with respect to the axis X-X which are different from each other at least over an axial part of the channel 35. Such alternative can be envisaged both in the case where the faces 33 and 34 consist respectively, of a single truncated cone, and in the case where one and/or the other of the faces 33 and 34 each consist of at least two truncated cones, as discussed in detail hereinabove. In the case where the faces 33 and 34 each consist of a single truncated cone, the above is equivalent with the angles $\alpha$ and $\beta$, as defined hereinabove, being different from each other. Such difference between the angles $\alpha$ and $\beta$ or, more generally, the difference between the respective angulations of the faces 33 and 34, can be provided so as to keep the passage cross-section of the channel 35 substantially constant over all or part of the axial extent thereof by reducing the thickness thereof from the upstream end 35A thereof to the downstream end 35B thereof.

the internal member 32 can be equipped with a tool 39 for fragmenting the material 5 coming out of the outer casing 31. The specific features of the fragmentation tool 39 are not limiting, being noted only that the fragmentation tool makes use of the rotation of the internal member 32 in order to act on the food product 1 when the product emerges from the channel 35.

The invention claimed is:

1. A system for continuous preparation of an extruded food product, comprising:

a raw material that is rich in protein and water, a sleeve inside which at least one screw is driven so as to apply a thermomechanical treatment to the raw material, and a die for extrusion of a protein and water-rich material, the die comprising:

an outer casing, which is tubular, being centered on an axis, and which has a frusto-conical inner face, centered on the axis and divergent downstream, the outer casing being fixedly connected to the sleeve so that the material emerging from the sleeve is pushed by the at least one screw through the die, and an internal member, which is arranged coaxially inside the outer casing and mounted so as to rotate about the axis with respect to the outer casing, and which includes both:

an upstream part, extending at least partially inside the outer casing and having a frusto-conical outer face, centered on the axis and diverging towards the downstream, and a downstream part, extending outside the outer casing and coupled to a motorization suitable for rotating the internal member about the axis, wherein the outer casing and/or the upstream part of the internal member are thermally regulated, wherein the frusto-conical inner face of the outer casing and the frusto-conical outer face of the internal member delimit therebetween a channel having an upstream end and a downstream end, which are opposite each other along the axis and between which the material flows in the channel, so that when the material is pushed through the die, the material advances through the channel from the upstream end to the downstream end through which the material exits outside of the outer casing, wherein the sleeve includes, at the downstream end thereof, an end plate which internally delimits a through bore, centered on the axis and channeling the material pushed by the at least one screw out of the sleeve, wherein the system further includes a diffuser, which fixedly connects the end plate and the outer casing and which delimits a distribution chamber connecting the bore of the end plate and the upstream end of the channel, the distribution chamber being shaped so as to distribute the material emerging from the sleeve around the axis into the upstream end of the channel, wherein the outer casing comprises at least two separate modules, which delimit respective parts of the frusto-conical inner face and which follow one another in juxtaposition along the axis, and wherein the at least two modules of the outer casing are thermally regulated independently of each other.

2. The system according to claim 1, wherein the die includes an adjustment device suitable for adjustably modifying a position of the internal member with respect to the outer casing along the axis.

3. The system according to claim 1, wherein the outer casing is provided with thermoregulation means suitable for acting on the temperature of the material flowing in the channel by heat exchange with the frusto-conical inner face and for applying a temperature profile along the channel between the upstream and downstream ends of the channel.

4. The system according to claim 1, wherein the upstream part of the internal member is provided with thermoregulation means suitable for acting on the temperature of the material flowing in the channel by heat exchange with the frusto-conical outer face and for applying a temperature profile along the channel between the upstream and downstream ends of the channel.

5. The system according to claim 1, wherein the parts of the frusto-conical inner surface, delimited by the at least two modules, respectively, of the outer casing, are inclined with respect to the axis at respective angles which are different from each other.

6. The system according to claim 1, wherein the frusto-conical inner face of the outer casing and the frusto-conical outer face of the internal member are parallel to each other from the upstream end to the downstream end of the channel.

7. The system according to claim 1, wherein the frusto-conical inner face of the outer casing and the frusto-conical outer face of the internal member have respective angulations with respect to the axis which are different from each other at least over an axial part of the channel.

8. The system according to claim 1, wherein the distribution chamber is provided with a frusto-conical surface, which is centered on the axis and diverges downstream so as to connect an upstream part of the distribution chamber to the frusto-conical inner face of the outer casing.

9. The system according to claim 1, wherein an upstream end of the upstream part of the internal member is at least partially arranged in the diffuser, delimiting, together with the diffuser, the distribution chamber.

10. The system according to claim 1, wherein the internal member comprises at least two separate modules, which delimit respective parts of the frusto-conical outer face and which follow one another in juxtaposition along the axis.

11. The system according to claim 10 wherein the parts of the frusto-conical outer face, delimited by the at least two modules, respectively, of the internal member, are inclined with respect to the axis at respective angles which are different from each other.

12. A system for continuous preparation of an extruded food product, comprising:

a raw material that is rich in protein and water, a sleeve inside which at least one screw is driven so as to apply a thermomechanical treatment to the raw material, and a die for extrusion of a protein and water-rich material, the die comprising:

an outer casing, which is tubular, being centered on an axis, and which has a frusto-conical inner face, centered on the axis and divergent downstream, the outer casing being fixedly connected to the sleeve so that the material emerging from the sleeve is pushed by the at least one screw through the die, and an internal member, which is arranged coaxially inside the outer casing and mounted so as to rotate about the axis with respect to the outer casing, and which includes both:

an upstream part, extending at least partially inside the outer casing and having a frusto-conical outer face, centered on the axis and diverging towards the downstream, and a downstream part, extending outside the outer casing and coupled to a motorization suitable for rotating the internal member about the axis, wherein the outer casing and/or the upstream part of the internal member are thermally regulated, wherein the frusto-conical inner face of the outer casing and the frusto-conical outer face of the internal member delimit therebetween a channel having an upstream end and a downstream end, which are opposite each other along the axis and between which the material flows in the channel, so that when the material is pushed through the die, the material advances through the channel from the upstream end to the downstream end through which the material exits outside of the outer casing, wherein the sleeve includes, at the downstream end thereof, an end plate which internally delimits a through bore, centered on the axis and channeling the material pushed by the at least one screw out of the sleeve, wherein the system further includes a diffuser, which fixedly connects the end plate and the outer casing and which delimits a distribution chamber connecting the bore of the end plate and the upstream end of the channel, the distribution chamber being shaped so as to distribute the material emerging from the sleeve around the axis into the upstream end of the channel, wherein the internal member comprises at least two separate modules, which delimit respective parts of the frusto-conical outer face and which follow one another in juxtaposition along the axis, and wherein the at least two modules of the internal member are rotatable about the axis independently of each other.

13. A system for continuous preparation of an extruded food product, comprising:

a raw material that is rich in protein and water, a sleeve inside which at least one screw is driven so as to apply a thermomechanical treatment to the raw material, and a die for extrusion of a protein and water-rich material, the die comprising:

an outer casing, which is tubular, being centered on an axis, and which has a frusto-conical inner face, centered on the axis and divergent downstream, the outer casing being fixedly connected to the sleeve so that the material emerging from the sleeve is pushed by the at least one screw through the die, and an internal member, which is arranged coaxially inside the outer casing and mounted so as to rotate about the axis with respect to the outer casing, and which includes both:

an upstream part, extending at least partially inside the outer casing and having a frusto-conical outer face, centered on the axis and diverging towards the downstream, and a downstream part, extending outside the outer casing and coupled to a motorization suitable for rotating the internal member about the axis, wherein the outer casing and/or the upstream part of the internal member are thermally regulated, wherein the frusto-conical inner face of the outer casing and the frusto-conical outer face of the internal member delimit therebetween a channel having an upstream end and a downstream end, which are opposite each other along the axis and between which the material flows in the channel, so that when the material is pushed through the die, the material advances through the channel from the upstream end to the downstream end through which the material exits outside of the outer casing, wherein the sleeve includes, at the downstream end thereof, an end plate which internally delimits a through bore, centered on the axis and channeling the material pushed by the at least one screw out of the sleeve, wherein the system further includes a diffuser, which fixedly connects the end plate and the outer casing and which delimits a distribution chamber connecting the bore of the end plate and the upstream end of the channel, the distribution chamber being shaped so as to distribute the material emerging from the sleeve around the axis into the upstream end of the channel, wherein the internal member comprises at least two separate modules, which delimit respective parts of the frusto-conical outer face and which follow one another in juxtaposition along the axis, and wherein the at least two modules of the internal member are thermally regulated independently of each other.

* * * * *